(12) United States Patent
Shindelar et al.

(10) Patent No.: US 8,505,960 B1
(45) Date of Patent: Aug. 13, 2013

(54) COLLAPSIBLE CART

(76) Inventors: John Oliver Shindelar, Coeur d'Alene, ID (US); Stuart Zinke, Coeur d'Alene, ID (US)

(*) Notice: Subject to any disclaimer, the term of this patent is extended or adjusted under 35 U.S.C. 154(b) by 234 days.

(21) Appl. No.: 12/842,685

(22) Filed: Jul. 23, 2010

(51) Int. Cl.
*B62B 1/00* (2006.01)

(52) U.S. Cl.
CPC .......................................... *B62B 1/00* (2013.01)
USPC ....................... 280/651; 280/47.34; 280/47.41

(58) Field of Classification Search
USPC ........... 280/651, 654, 659, 639, 47.26, 47.34, 280/47.35, 781, 47.41
See application file for complete search history.

(56) References Cited

U.S. PATENT DOCUMENTS

| | | | | |
|---|---|---|---|---|
| 5,002,293 A * | 3/1991 | Gottselig | | 280/47.35 |
| 5,476,285 A * | 12/1995 | Dickerson | | 280/781 |
| 5,915,723 A * | 6/1999 | Austin | | 280/651 |
| 5,927,745 A * | 7/1999 | Cunningham | | 280/652 |
| 6,796,565 B2 * | 9/2004 | Choi et al. | | 280/47.35 |
| 7,080,844 B2 * | 7/2006 | Espejo | | 280/639 |
| 7,377,525 B1 * | 5/2008 | Whitmore | | 280/47.34 |
| 7,806,426 B2 * | 10/2010 | Van Landingham et al. | | 280/651 |
| D652,190 S * | 1/2012 | Slaton et al. | | D34/17 |
| 8,172,239 B1 * | 5/2012 | Boyd et al. | | 280/47.26 |
| 2002/0105169 A1 * | 8/2002 | Dahl | | 280/651 |
| 2004/0104560 A1 * | 6/2004 | Tedesco | | 280/651 |
| 2010/0032927 A1 * | 2/2010 | Gordon | | 280/659 |

* cited by examiner

*Primary Examiner* — Hau Phan
(74) *Attorney, Agent, or Firm* — John C. Meline

(57) ABSTRACT

Described is a collapsible cart that provides substantial stability when operated. Enlarged inflatable or compliant rear wheels allow an operator to lift a front end of the cart to traverse rough surfaces as needed. Enlarged rear wheels are mounted outside an overhead profile of the collapsible cart thereby providing lateral and other stability. A first shelf, bucket or working surface may be collapsed to contact or mate with a second such shelf to create an easily transportable or storable collapsed structure. A telescoping handle allows a collapsed cart to serve as a hand dolly.

19 Claims, 13 Drawing Sheets

COLLAPSIBLE CART

FIELD OF INVENTION

The present invention relates to carts.

BACKGROUND

Known four-wheeled carts are excessively heavy and excessively bulky. Further, these carts are often not collapsible or easily disassembled for transportation. For example, known four wheeled carts are not easily transported in land vehicles and airplanes where the bulk of the cart displaces valuable space needed for equipment storage.

Further, known four-wheeled carts are assembled with a relatively small castor wheel directly under each corner of the cart. This configuration makes the cart unstable or top-heavy, especially during movement of the cart such as when a castor wheel impacts a small object or when the cart is taken over a step, curb or uneven ground. Known four-wheeled carts also cannot effectively move across outdoor surfaces such as a lawn, deck or uneven sidewalk. In addition, known four-wheeled carts cannot easily negotiate stairs either in a collapsed state or in an assembled state.

When known carts are in a collapsed or disassembled state, the carts are no longer operational. Thus, known collapsed carts serve no other purpose than to be treated as objects to be placed into storage or loaded for transportation.

SUMMARY

This Summary is provided to introduce a selection of concepts in a simplified form that are further described below in the Detailed Description. This Summary is not intended to identify key or essential features of the claimed subject matter, and it is not intended to be used to limit the scope of the claimed subject matter.

One aspect of the present invention provides for collapsible legs between a first shelf or working surface and a second shelf or working surface of a cart. While two shelves or working surfaces are described, it is understood that any number and configuration of shelves or working surfaces may be used consistent with the principles disclosed herein. Further, while four legs are shown in the Figures and described herein, any number of collapsible legs is possible. If two or more collapsible legs are available, the extension of less than all of the legs may provide an inclined shelf or working surface.

Another aspect of the present invention provides for at least one pair of wheels mounted outside the profile of a first or bottom shelf of the cart. Such mounting provides increased stability and improved transportability to the cart. In a preferred implementation, such wheels are inflatable. If just one pair of inflatable wheels is used, these wheels are placed at the rear of the cart. The inflatable wheels may be larger than traditionally sized castor wheels. The inflatable wheels provide a means for the cart to be used as a hand dolly when the cart is in a collapsed configuration.

In an optional aspect of the present invention, at least one pair of castor wheels can be adjustably swiveled and locked into a configuration outside the profile of the cart. The swiveling of the castor wheels provides for increased lateral stability to the cart when desired.

In another optional aspect of the present invention, a handle provides for a means to use the cart as a hand dolly. In a preferred aspect, a handle can be telescoped or reversibly lengthened for increased leverage and improved maneuverability of the cart.

These and other aspects of the invention are described further in the Detailed Description.

BRIEF DESCRIPTION OF THE DRAWINGS

The novel features believed characteristic of the subject matter are set forth in the appended claims. Throughout, like numerals refer to like parts with the first digit of each numeral generally referring to the figure which first illustrates the particular part. The subject matter and one or more preferred modes of use are best understood by reference to the following Detailed Description of illustrative implementations when read in conjunction with the accompanying drawings, wherein:

DETAILED DESCRIPTION

While the invention is described below with respect to one or more preferred implementations, other implementations are possible. The concepts disclosed herein apply equally to other devices for transporting bulk materials. Furthermore, the concepts applied herein apply more generally to carts, dollies and trucks. The invention is described below with reference to the accompanying figures.

While various forms and types of carts, dollies and trucks have been created to transport goods, all of them have failed to adequately address some basic functionalities provided by the various implementations of a collapsible cart described herein. Thus, there has been a need for a collapsible utility cart that can overcome various and known shortcomings.

The implementations described herein are advantageous to many types of users including trade show vendors, painters, home repairers, electricians, contractors, yard workers, mechanics and others who need to transport materials and to those users who would like a portable working surface. The implementations of a collapsible or foldable cart described herein can provide significantly improved time savings and utility over known carts. Several examples are illustrative. Known utility carts, especially those marketed to consumers, cannot provide sufficient lateral stability and a working surface about waist high to accept and transport, for example, a large television or box. Known utility carts do not fit into a car trunk. Known utility carts do not travel easily onto a porch and over a door sill, especially when laden with a substantially heavy or bulky load.

Figure 1:
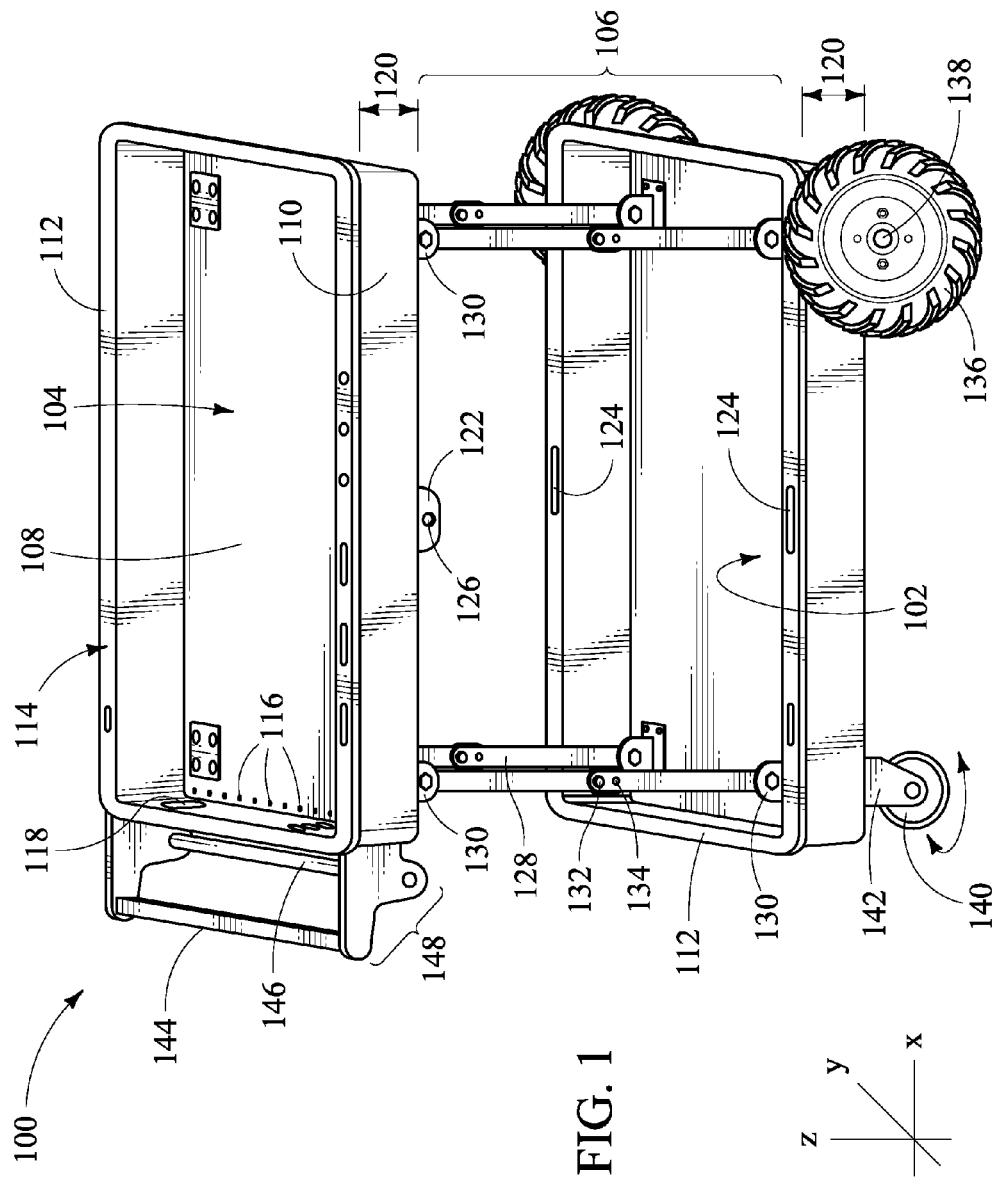
FIG. 1 is a side perspective view of a collapsible cart in an extended configuration according to a first exemplary implementation.

FIG. 1 shows a side perspective view of a collapsible cart in an extended configuration and according to a first exemplary implementation. With reference to FIG. 1, a collapsible cart 100 comprises a first shelf 102 and a second shelf 104 separated by collapsible legs 106. A shelf is comprised of various features such as a working surface 108, raised sides 110, a rolled lip 112, one or more working apertures 114 in the rolled lip 112 and one or more drain holes 116. A working surface 108 may be smooth, textured, corrugated, flexible, rigid, or a lattice or formed into a net-like configuration or made of such material. Drain holes 116 or other openings may be effective in allowing liquids (e.g. rain water) to exit the shelf without allowing a vast majority of items (not shown) to leave the working surface 108 and thus preventing the items from getting lost or soiled. The raised sides 110 may also have vertical working apertures 118. The raised sides 110 may be of any height 120. The height 120 of a raised side 110 of a first shelf 102 may be the same or different from the height 120 of a raised side 110 of a second shelf 104 or other shelf or other working surface of a cart 100. In one implementation, the raised sides 110 may be vertically adjusted relative to the working surface 108 by a side raising, lowering or adjusting mechanism (not shown in FIG. 1, but for example, is comprised of a mounted sprocket and a series of teeth or grating in the raised sides). Such a side adjusting mechanism preferably does not interfere with stacking or mating of a first shelf 102 to a second shelf 104.

A first shelf 102 and a second shelf 104 may have one or more features that can provide locking or increased engaging of the two shelves such that the two shelves are less likely to move relative to one another when the collapsible cart 100 is in a fully or partially collapsed state. For example, as shown in FIG. 1, a second shelf 104 has an engagement tab 122 at the bottom edge of a raised side 110. The engagement tab 122 of the second shelf 104 may fit into an engagement groove or slot 124 in the rolled lip 112 of the vertical side of the first shelf 102 when the cart 100 is in a collapsed state. To encourage the shelves to stay engaged with each other when the cart 100 is collapsed, each engagement tab 122 may comprise a spring-loaded ball latch 126. Other mechanisms may be used in association with an engagement tab 122 such as a pin through a hole (not shown) in the engagement tab.

Collapsible legs 106 are each comprised of one or more segments 128. In the implementation shown in FIG. 1, each collapsible leg 106 is comprised of two segments 128 and each segment is attached to a shelf at a leg bracket 130. Each collapsible leg 106 is hinged near its middle with a bolt 132 or other flexible or bendable joint. In the implementation shown in FIG. 1, each collapsible leg 106 has a spring-loaded latch 134 that keeps each leg 106 extended until a user desires to collapse the leg 106. Alternatively, instead of a spring-loaded latch 134, a collapsible leg 106 may be kept in an extended orientation by a removable pin or other mechanism.

With reference to FIG. 1, each back wheel 136 is mounted or constructed to operate outside the raised sides 110 of a first shelf or working surface 102 or outside the profile of the first shelf 102. In alternative implementations, each back or rear wheel 136 may be folded or extended to a fixed position outside the raised sides 110 of a first shelf 102. In a preferred implementation, each back wheel 136 is inflatable, rubbery or otherwise made of a relatively compliant material. The back wheel axis or axel 138 may be above, within or below a first shelf 102. In an optional implementation, a pair of back or rear wheels 136 is mounted on an axel (not shown). In another implementation, each back wheel 136 is mounted on its own support structure so as to operate independently of the other back wheel 136. Optionally, each back wheel 136 is provided with a damping mechanism or shock absorbing mechanism such as, but not limited to, a spring, a leaf spring, or hydraulic shock absorber.

Inflatable back wheels 136 placed outside the profile of a first shelf 102 (as the cart is viewed from overhead) provide the cart 100 increased lateral stability as compared to previously known carts. The increased size, type and location of the back wheels 136 improve lateral stability, especially when a substantial load is placed in or on the second shelf 104 and a lateral force is applied to the cart 100. Further, the size and location of the back wheels 136 enable the front of the cart 100 to be raised from the ground or traveling surface and allow an operator to move the cart over a dramatically increased number and types of traveling surfaces as compared to known carts. For example, the cart 100 may then travel relatively easily, even while loaded, over lawns, doorframes, door sills, rough ground, gravel surfaces, curbs, and earthen fields. The cart 100 may even be able to negotiate stairs and other previously non-negotiable areas when the collapsible legs 106 are partially or fully extended while the cart 100 rides completely or partially on its back wheels 136. When a cart 100 as described herein arrives at a work site, the second shelf 104 provides an improved working surface for users, a place to set tools and lay out materials.

In FIG. 1, the front wheels 140 are shown inside the profile of the first shelf 102 or under the first shelf 102. However, in other implementations, to provide increased stability, the front wheels 140 may be mounted individually or on an axel which is outside the profile of the first shelf 102 (as seen from above) thereby providing additional increased stability including increased lateral stability.

In an implementation of a collapsible cart, the front wheels 140 are swivel castor wheels that can swivel in a plane generally parallel with the traveling surface (x-y plane). In a preferred implementation, the front of the cart 100 is slightly lower relative to the back of the cart 100 since the height of the front wheels 140 (or the combination of front wheels 140 and accompanying mounting elements) is shorter than the effective height of the back wheels 136. This configuration provides a tendency for a cart operator to slightly lift the front wheels 140 from the traveling surface upon the cart 100 receiving a first impulse of force in a forward direction (toward the front wheels 140) or rearward direction (toward the back wheels 136). In this way, any load on the front wheels 140 is reduced when the cart 100 first begins its motion. At this start of motion, a collapsible cart 100 is operating strongly on its rear wheels 136 such that the load on the collapsible cart 100 is primarily on the back wheels 136. Such operation provides an improved or smoother lateral, pivotal or forward motion or ride to the collapsible cart 100. In an optional implementation, the front wheels 140 may comprise a suspension mechanism 142 to reduce the impact of uneven traveling surfaces on the cart 100 and to items (not shown) in the cart 100.

The cart 100 may comprise a handle 144 and may comprise a utility bar 146. In a preferred implementation, the handle 144 is attached to or forms part of the second shelf 104. The utility bar 146 may be mounted in a utility region 148 between the handle 144 and the second shelf 104. In an optional implementation, a toolbox or container is specially shaped to securely lodge or lock into the utility region 148. Such a container (not shown) provides a location for relatively smaller items to be transported and allows the second shelf 104 to serve more productively as a working surface when an operator uses the cart as a raised working surface.

Figure 2:
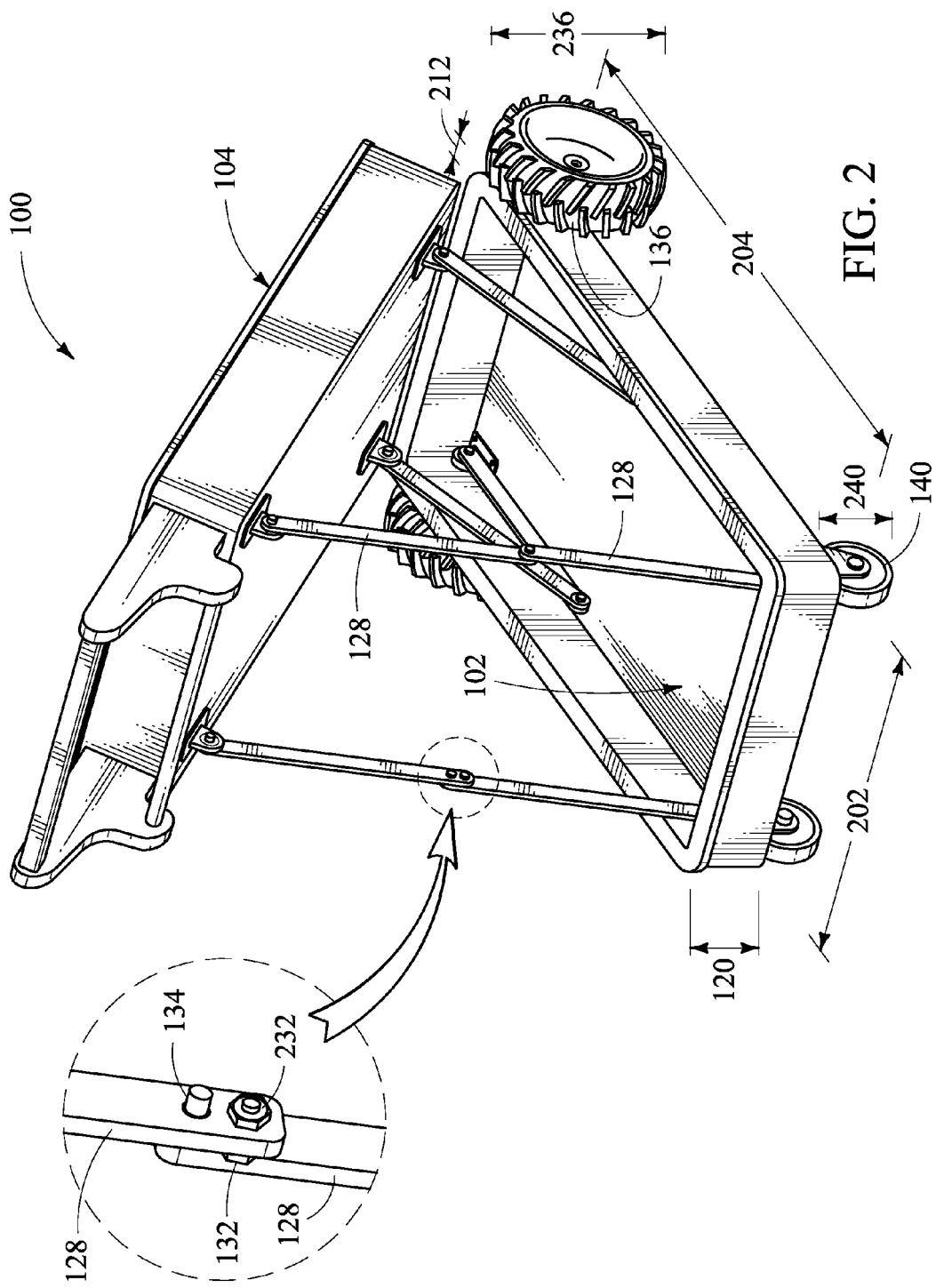
FIG. 2 is a perspective view of a collapsible cart in a partially collapsed configuration according to the first exemplary implementation shown in FIG. 1.

FIG. 2 is a perspective view of a collapsible cart according to the first exemplary implementation shown in FIG. 1 and in a partially collapsed configuration. With reference to FIG. 2, each collapsible leg 106 of a back pair of collapsible legs is nearly fully collapsed. As shown, each collapsible leg 106 is hinged in its center region. In the implementation shown in FIG. 2, each collapsible leg 106 collapses toward the interior of the first shelf 102. Each of the front collapsible legs 106 may similarly be placed into a collapsed state such that each of these legs collapses toward the interior of the cart 100. A front collapsible leg 106 is offset from a corresponding back collapsible leg 106 such that when both of such collapsible legs 106 are in a collapsed state, the collapsed collapsible legs 106 do not interfere with or otherwise impact one another. In some implementations, a front collapsible leg and a rear collapsible leg may overlap each other or otherwise stack on top of one another when both are in a partial or fully collapsed state.

Figure 13:
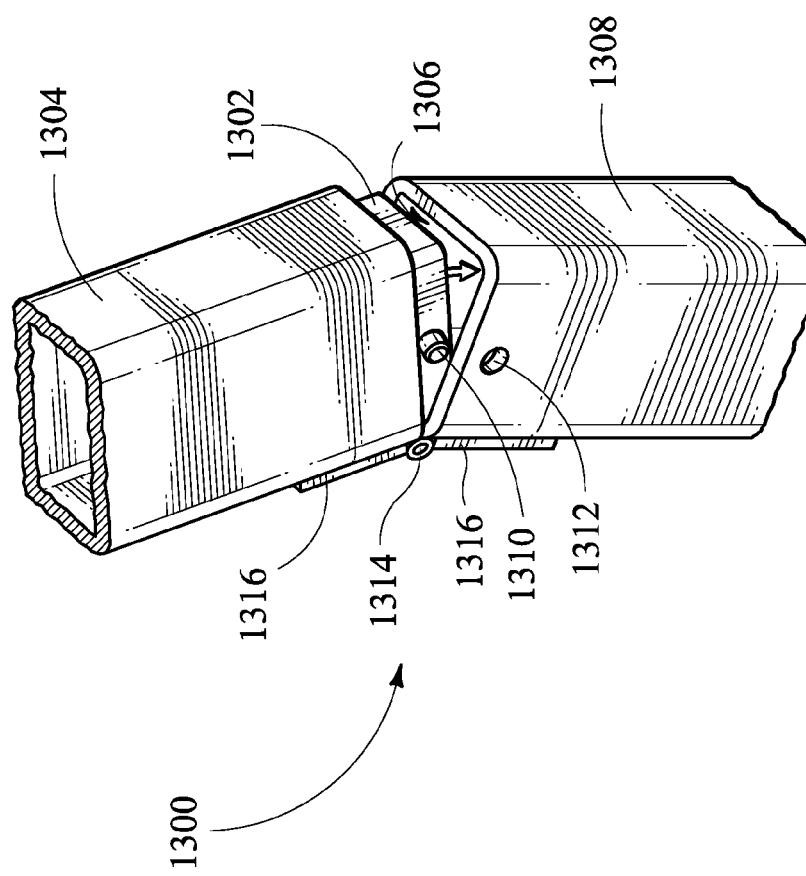
FIG. 13 is a perspective close-up view of a knee joint for an implementation of a collapsible leg for a collapsible cart, an alternative joint to the one shown in FIG. 1 and FIG. 2.

A close-up view of a collapsible leg 106 shows, in one exemplary implementation, that a collapsible leg comprises a bolt 132, a nut 232 and a spring-loaded latch 134. The spring-loaded latch 134 is a mechanism to releasably lock and maintain a collapsible leg 106 in an extended position. Other implementations of a releasable lock are possible such a second bolt and threaded nut. One such implementation is shown in FIG. 13. In a preferred implementation, a collapsible leg 106 may be reversibly locked in one or more partially extended state or in a fully extended state or position.

With reference to FIG. 2, the second shelf 104 provides an inclined working surface that may provide an improved working surface as compared to other carts, dollies and trucks. While not shown in FIG. 2, each of the collapsible legs 106 may be independently adjusted to a full or partially extended position thereby allowing an operator to select any of a plurality of orientations for a second shelf 104 relative to a first shelf 102 or relative to the surface on which the collapsible cart 100 rests or travels.

In one implementation, a width 202 of a first shelf 102 is preferably between 16 and 24 inches, but may be of any dimension. The width 202 of the first shelf 102 may be smaller than, the same as, or greater than a width of a second shelf 104. A length 204 of the first shelf 102 is preferably between 26 and 48 inches, but may be of any dimension. The length 204 of the first shelf 102 may be smaller than, the same as, or greater than a length of a second shelf 104.

A height 236 of each of the rear wheels 136 may be of any dimension. In a preferred implementation, the height 236 of each of the rear wheels 136 is between about 6 and about 15 inches. A height 240 of each of the front wheels 140 may be of any dimension. In a preferred implementation, the height 240 of each of the front wheels 140 is between about 2 and about 12 inches. For a particular construction of a cart, a height 236 of the rear wheels 136 and a height 240 of the front wheels 140 may each be selected such that a plane defining the first shelf 102 is inclined toward the front of the cart 100, relatively level or parallel with a traveling surface, or inclined toward the rear of the cart 100. In another implementation, the height of the rear wheels 136 and a height of the front wheels 140, for each wheel, may be independently adjusted or selected by a cart operator.

A width 212 of a rolled edge of a first shelf 102 and a width 212 of a rolled edge of a second shelf may be of any dimension. The width 212 of a rolled edge may depend upon the material used to make the shelf or may be selected to enable or facilitate one or more features in the rolled edge of the shelf.

Figure 3:
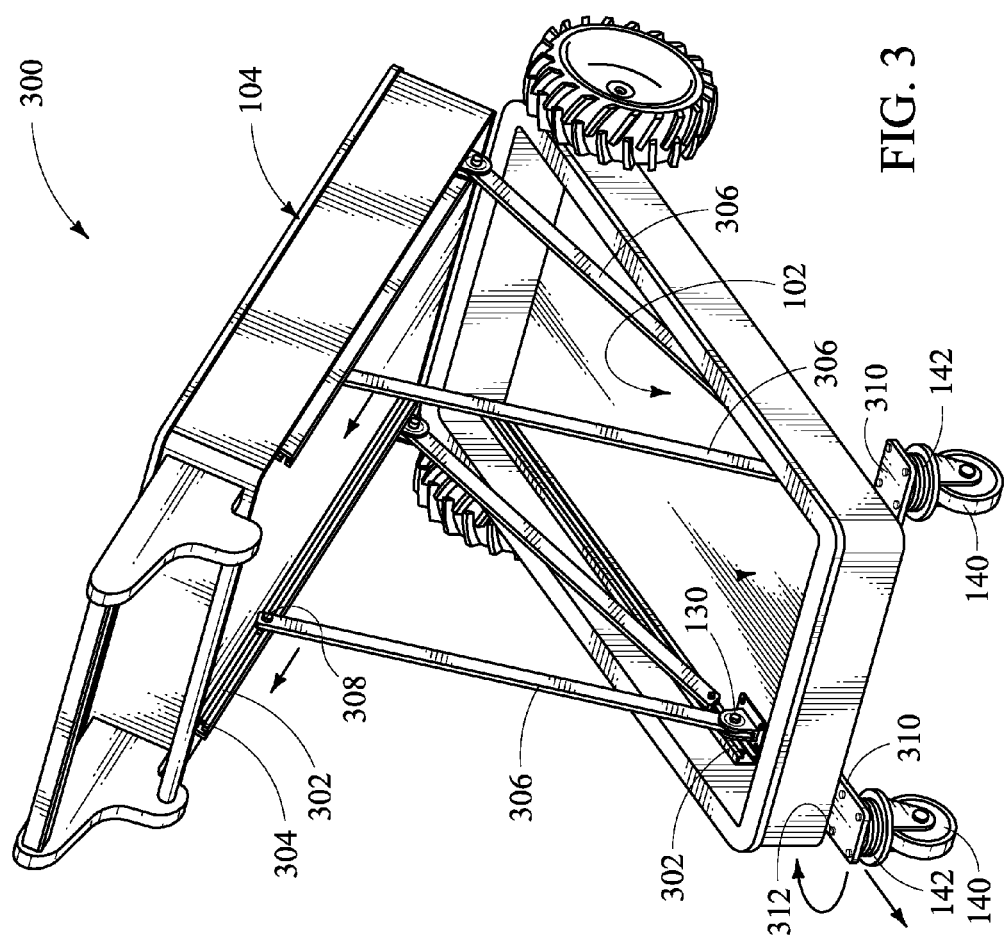
FIG. 3 is perspective view of a collapsible cart in a partially collapsed configuration according to a second exemplary implementation where one or more collapsible legs operate by sliding a pin or other implement in a groove or slot.

FIG. 3 is perspective view of a collapsible cart 300 in a partially collapsed configuration according to a second exemplary implementation. With reference to FIG. 3, the second exemplary implementation comprises collapsible legs 306. Each collapsible leg 306 comprises a bolt, peg or roller 308. One or both ends of each collapsible leg 306 slide in a slotted bracket, groove or slot 302. The slotted bracket, groove or slot 302 is attached to, formed in, or forms part of a shelf. FIG. 3 shows collapsible legs 306 where only a single end of each collapsible leg 306 slides in a slotted bracket 302. In the implementation shown in FIG. 3, the front collapsible legs 306 are each mounted to a leg bracket 130 of a first shelf 102 and the rear collapsible legs 306 are each mounted to a leg bracket 130 of a second shelf 104. Each slotted bracket, groove or slot 302 may comprise one or more recesses, a marking, a bolt, a pin, a nut or other feature 304 that can serve as a stopper or a stopping location for a bolt, peg or roller 308. In a preferred implementation of collapsible cart 300, a front collapsible leg 306 is attached to a leg bracket 130 on a shelf and slides in a bracket, groove or slot 302 mounted to or forming part of another shelf.

The second exemplary implementation of a collapsible cart 300 comprises an extendable front wheel bracket 310 for each front wheel 140. Each front wheel 140 is mounted with one or more mounting fasteners 312. Each front wheel bracket 310 may be extended toward the front of the cart 300 and may be rotated to a lateral side of the cart 300 (once extended toward the front of the cart 300) or may be directly extended toward a lateral side of the cart 300. Each front wheel bracket 310 may be reversibly locked into place. The extendable front wheels 140 then can provide increased stability to the cart 300. Each front wheel bracket 310 comprises a suspension mechanism 142 to reduce the impact of uneven traveling surfaces on the cart 300.

Figure 4:
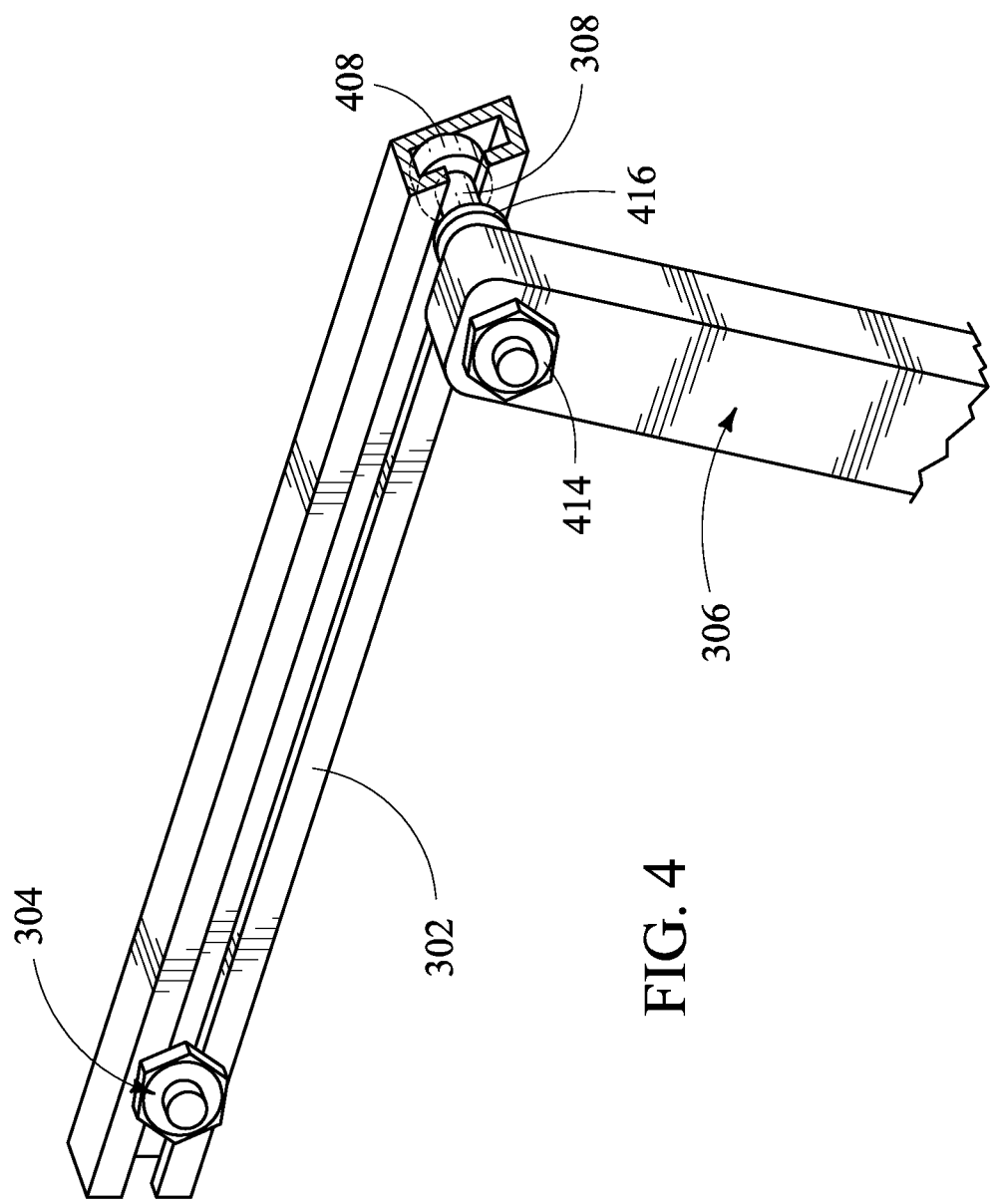
FIG. 4 is a close up of a pin and groove mechanism for collapsing or extending any of the collapsible legs shown in shown in FIG. 3.

FIG. 4 is a close up of a pin and groove mechanism for collapsing or extending any of the collapsible legs 306 shown in shown in FIG. 3. With reference to FIG. 4, a pin 308 comprises a wheel 408 that rolls back and forth in a groove 302. The wheel 408 and a washer 416 facilitate sliding or movement of the collapsible leg 306 in the groove 302. A threaded nut 414 fastens the pin 308 to the collapsible leg 306. The pin and groove mechanism is one of many possible mechanisms for allowing a collapsible cart to be taken between an extended state and a collapsed state. In certain implementations, a collapsible cart may be placed in partially collapsed and operational state.

Figure 5:
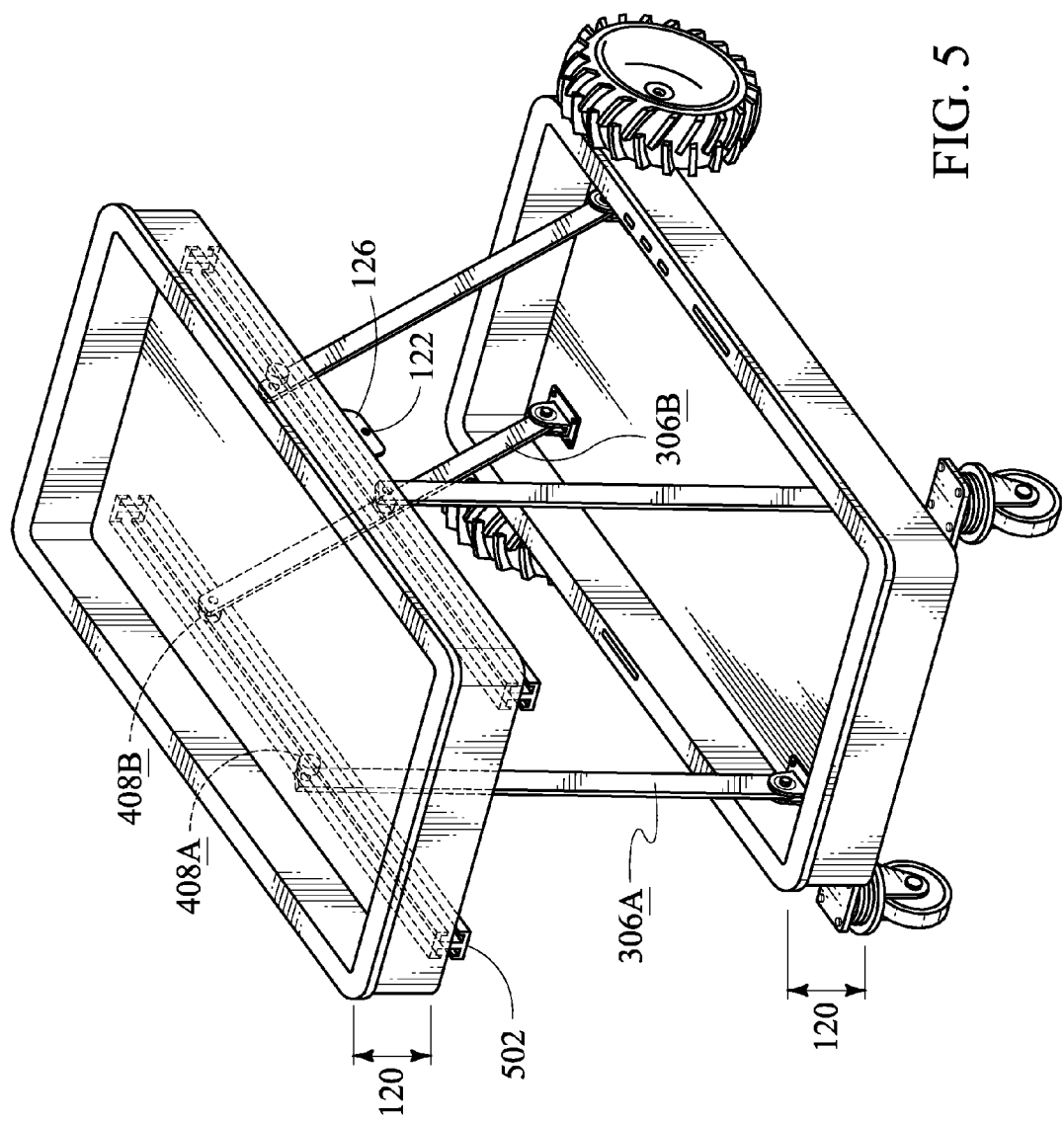
FIG. 5 is a perspective view of a collapsible cart in a partially extended configuration according to a third exemplary implementation.

FIG. 5 is a perspective view of a collapsible cart in a partially collapsed or partially extended configuration or state according to a third exemplary implementation. With reference to FIG. 5, a front collapsible leg 306A and a corresponding wheel 408A slide along one side of a doubly grooved track 502 and a back collapsible leg 306B and a corresponding wheel 408B slide along an opposing side of the doubly grooved track 502. In this particular implementation, a doubly grooved track 502 provides for a simplified construction and ensuring smooth operation as an operator collapses or extends the collapsible legs. Depending on geometry, mechanism or implementation of collapsible leg, each collapsible leg may be independently extended, collapsed or positioned.

Figure 6:
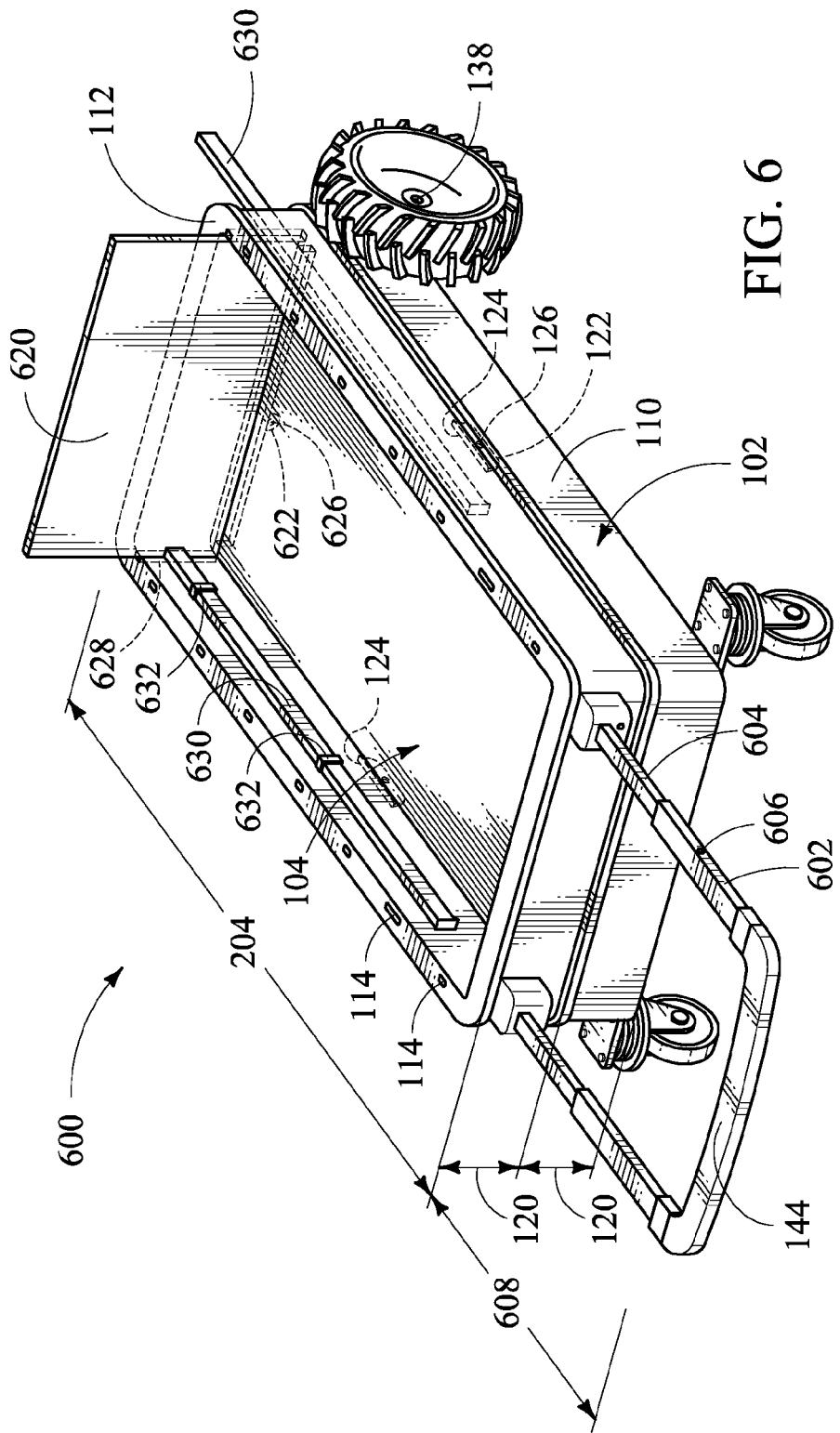
FIG. 6 is a perspective view of a collapsible cart in a collapsed configuration according to a fourth exemplary implementation.

FIG. 6 is a perspective view of a collapsible cart 600 in a collapsed configuration according to a fourth exemplary implementation. With reference to FIG. 6, a handle 144 comprises an extendable arm 602. The extendable arm 602 is slidably extendible along or over a base arm 604. The extendable arm 602 comprises a spring-loaded ball latch 606. The spring-loaded ball latch 606 of the extendable arm 602 facilitates placing the handle 144 in one of several available handle positions. Extending the handle 144 changes the distance 608 between the handle 144 the second shelf 104. When the extendible arm 602 and handle 144 are in an extended position, an operator has relatively more leverage to lift and rotate the cart 600 about the axis defined by the back wheel axel and axis 138 than when the handle 144 is collapsed.

With reference to FIG. 6, working apertures 114 in the second shelf 104 are exposed and may be used when the cart 600 is in a collapsed state. For example, an operator or user could stretch an elastic cord over one or more items (not shown) on or in the recess of the second shelf or working surface 104. FIG. 6 shows an engagement tab 122 protruding through an engagement slot 124 in a rolled edge of a raised side 110 of the bottom or first shelf 102. A spring-loaded ball latch 126 of the engagement tab 122 is engaged such that the top or second cart shelf 104 tends to remain mated to the first cart shelf 102. Other mechanisms other than an engagement tab 122 are possible. When in such a collapsed state, the collapsible cart 600 is easily stored and transported. For example, the collapsed collapsible cart 600 may be placed inside a car trunk, placed in the bed of a truck, or hooked on the side of a utility truck or other vehicle. In a collapsed state, a collapsible cart 600 is more easily handled and transported.

A collapsible cart 600 comprises a handcart plate. In an examplary implementation, and with reference to FIG. 6, a handcart plate 620 is reversibly engaged in one or more plate slots 628. Plate tabs 622 protrude through plate tab apertures (not shown). A spring-loaded ball latch 626 in one or more plate tabs 622 encourages the handcart plate 620 to remain in a relatively fixed position in the cart 600. When the handcart plate 620 is engaged in the cart 600, the cart 600 may be used similarly to a two-wheeled handcart or hand dolly instead of a four-wheeled cart. The handcart or hand dolly functionality is enhanced when the handle 144 is extended. The cart 600 is then more easily negotiated over uneven surfaces such as stairs, lawns, and construction sites.

A collapsible cart as described herein can serve many functions. For example, with reference to FIG. 6, in an optional implementation, an extendible rail 630 is available to extend or protrude from the back of the second shelf 104. One or more rail brackets 632 provide support to each extendible rail 630. An extendible rail 630 may serve a variety of purposes such as, but not limited to, a sawhorse and a support for anchoring a clamp or vise.

Figure 7:
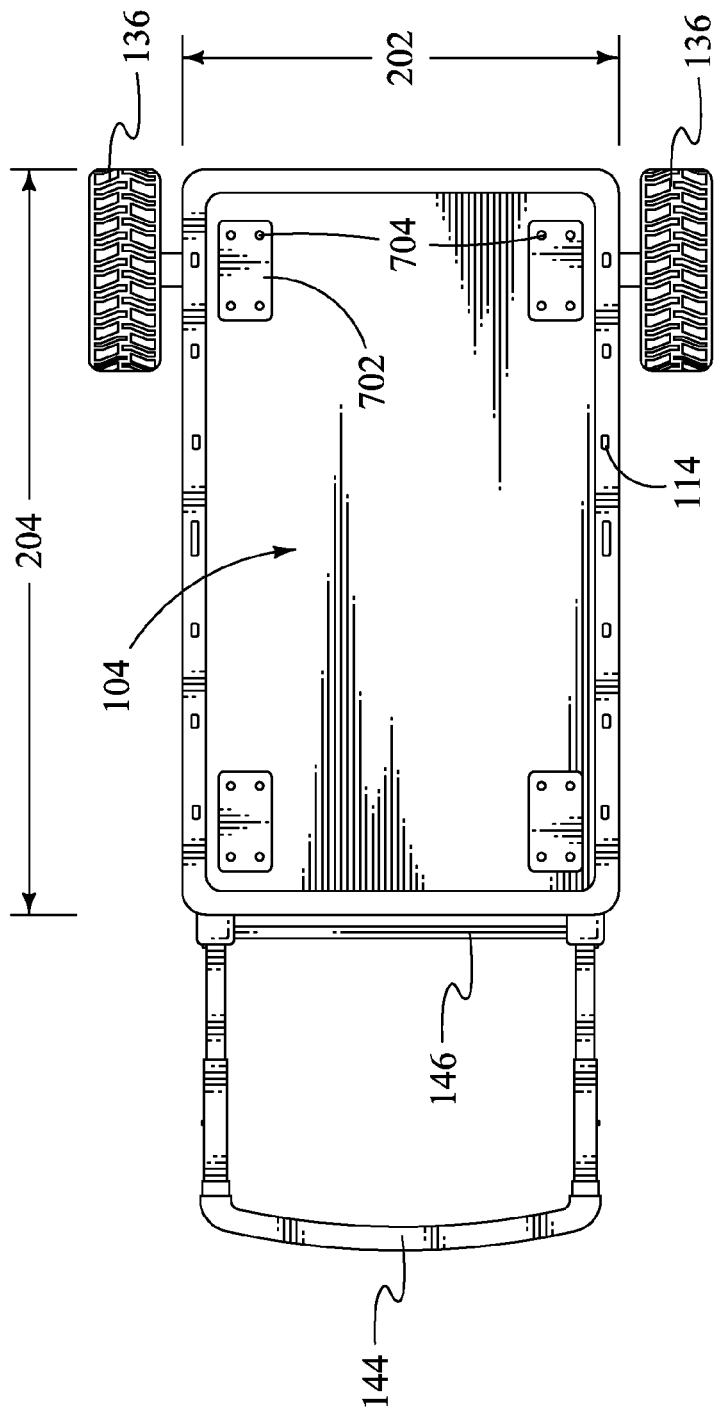
FIG. 7 is an overhead view of a collapsible cart according to a fourth exemplary implementation.

FIG. 7 is an overhead view of a collapsible cart according to a fourth exemplary implementation shown in FIG. 6. With reference to FIG. 7, a second shelf 104 is visible over the top of a first shelf (not shown). The two rear wheels 136 are outside the profile or perimeter of at least the first shelf and preferably outside the profile of the second shelf 104. A panel 702 is visible in each of the corners of the second shelf 104. The panel 702 comprises one or more fasteners 704 for a doubly grooved track (shown in FIG. 5) or for a leg bracket (viz. FIG. 3). The fastener 704 may be a screw, bolt or some other feature. The fastener 704 may be of any shape or configuration. The fastener 704 is only shown as a circular structure in FIG. 7 for illustrative purposes only. For simplicity of illustration, a handcart plate 620 and corresponding features are not shown in FIG. 7.

Figure 8:
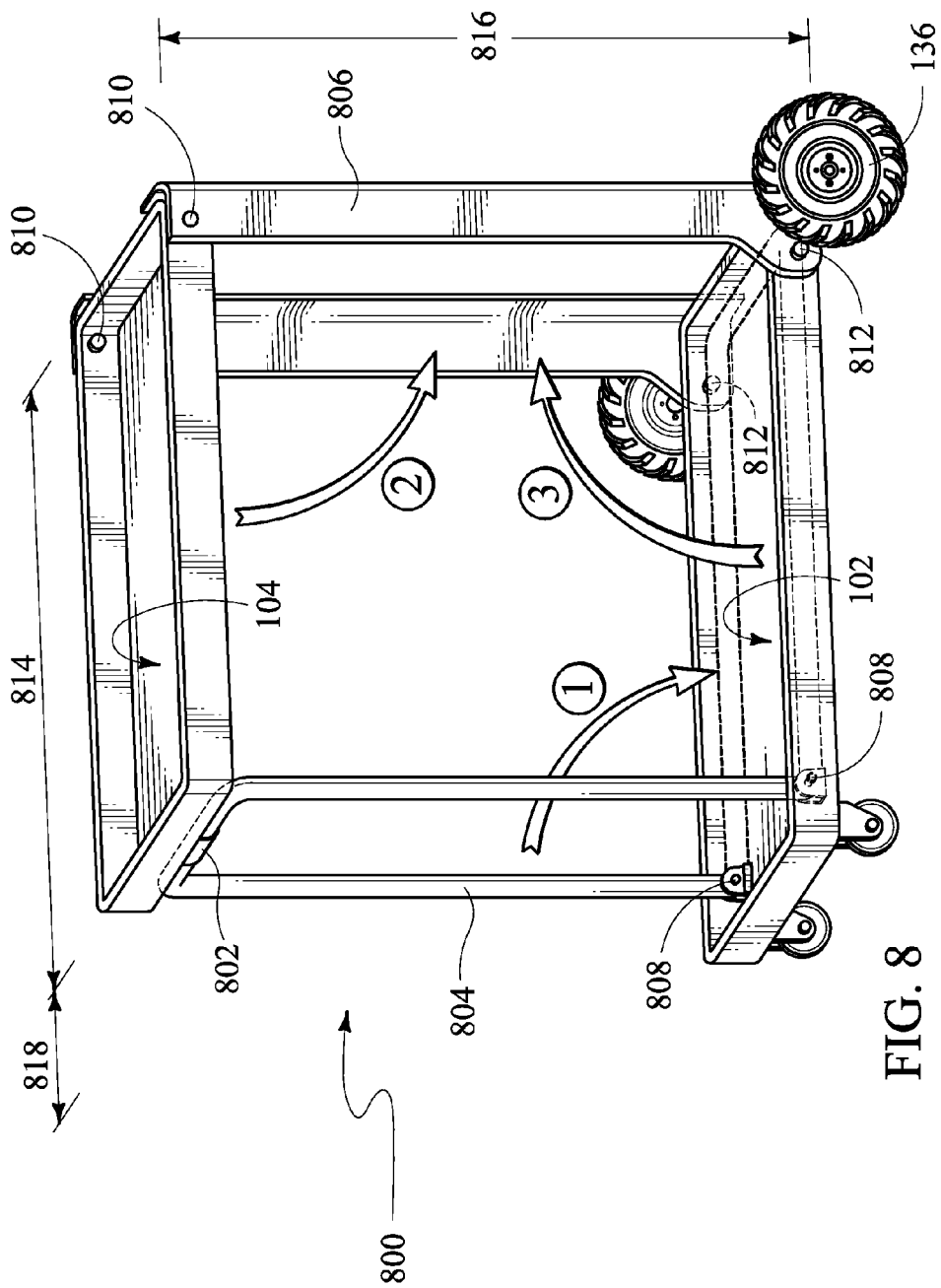
FIG. 8 is a perspective view of a collapsible cart according to a fifth exemplary implementation.

FIG. 8 is a perspective view of a collapsible or foldable cart 800 according to a fifth exemplary implementation. With reference to FIG. 8, in this exemplary implementation, a release mechanism 802 disengages from or releases a front leg or set of front foldable legs 804. In an exemplary implementation, the front leg is U-shaped. To collapse or fold this implementation of a collapsible cart 800, a series of steps is performed. A front leg 804 (or set of front foldable legs) is folded downward until it fits inside or proximal to a first shelf or working surface 102. Next, the front leg 804 pivots around a front set of pivot points 808 located in or near a front end of a first shelf or working surface 102. Optionally, if present, a handle (not shown) is removed from, folded into, or otherwise rotated or pivoted close to the second shelf or working surface 104. Subsequently, the second or top shelf or working surface 104 may be pivoted around a set of top pivot points 810 until the second or top shelf 104 is aligned with the back or rear legs 806. Next, the first or bottom shelf 102 may be rotated or pivoted around a set of rear or lower pivot points 812. In FIG. 8, the lower pivot points 812 are shown to comprise a bolt, rivet or pin through an aperture of a rear leg 806. However, other implementations of a pivot point 812 are possible.

In a preferred implementation, the length 814 of the second shelf 104 is smaller than the height 816 of the rear legs 806, although in other implementations, the second shelf 104 and the first shelf 102 may be of any shape, size or dimension consistent with functionality or utility disclosed herein. A handle distance 818 plus the length 814 of the top or second shelf 104 are preferably less than the height 816 of the rear legs 806 thereby removing the need to remove, pivot or change the position or orientation of a handle (not shown) before pivoting the top or second shelf 104 to align or pivot to be near the rear legs 806.

With reference to FIG. 8, although the U-shaped front leg 804 is shown mounted near an extreme end of the first shelf 102, and mounted to the first shelf 102, the U-shaped front leg bracket 804 may be located or mounted on either shelf or on another structure, and may be located at any point generally along a plane defined by one of the shelves. Once collapsed, the cart 800 may be moved, handled or manipulated by a second handle (not shown), which is preferably located or attached near the second shelf 104 and located generally above the rear wheels 136. As in other embodiments, once the collapsible or foldable cart 800 is collapsed, the foldable cart 800 may be operated or manipulated like a dolly or handcart.

Figure 9:
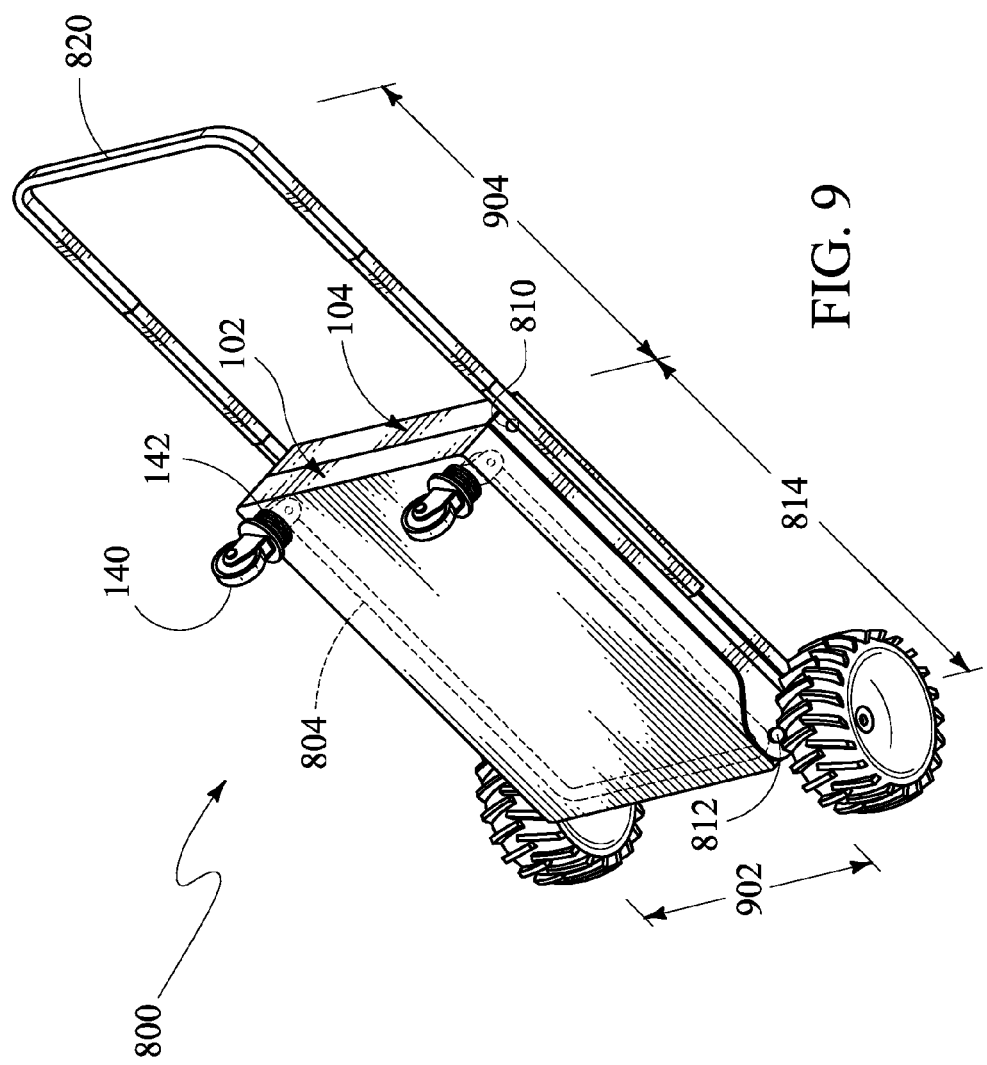
FIG. 9 is a perspective view of the collapsible cart shown in FIG. 8 and in a collapsed state.

FIG. 9 shows a perspective view of the collapsible cart 800 shown in FIG. 8 in a collapsed state and with a handle 820. With reference to FIG. 9, the first shelf 102 and the second shelf 104 are placed or mated together in a face-to-face or top-to-top orientation such that a hollow recess is formed between the two. When mated together, the shelves are mechanically encouraged to stay together with a spring-loaded ball latch on each of one or more tabs where each tab is inserted in a respective slot or opening (not shown in FIG. 9, but mechanism shown in FIG. 6). A second handle 820 in a collapsed, extended or other state allows an operator to easily move and manipulate the collapsed cart. (For simplicity of illustration, a second handle 820 is not shown in FIG. 8.)

In an exemplary implementation, the size or profile of a first shelf 102 is different from or complimentary to that of a second shelf 104 such that a first shelf 102 may be nested or recessed in the second shelf 104. The combined height 902 of the two shelves may thus be reduced. In a preferred implementation, the combined height 902 of the two shelves allows an operator to wheel the collapsed cart 800 with either the first shelf 102 or the second shelf 104 being closer to the ground or traveling surface. A second handle 820 may be extended to allow an operator to more easily handle the collapsed cart 800 and to treat or work with the collapsed cart 800 more like a dolly or handcart than a traditional, rigid cart.

Figure 10:
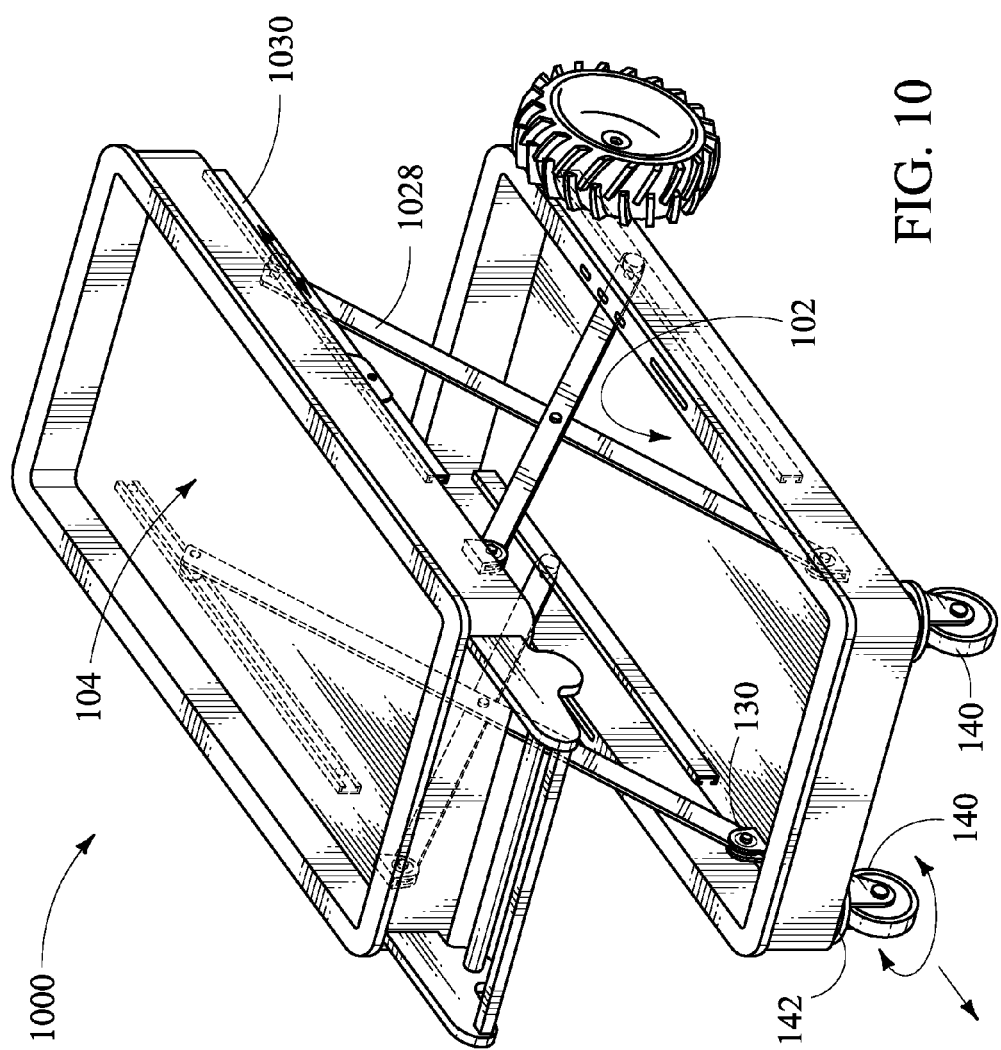
FIG. 10 is a perspective view of a collapsible cart according to a sixth exemplary implementation.

FIG. 10 is a perspective view of a collapsible cart according to a sixth exemplary implementation. With reference to FIG. 10, a collapsible cart 1000 comprises collapsible legs each with a single leg segment 1028. Each leg segment 1028 is connected to one other leg segment 1028 in a scissor-like arrangement. This arrangement allows for at least one end of each leg segment 1028 to travel in a slot or channel 1030 and for each pair of legs (e.g. a front leg and a back leg) to operate like a scissor. The slot or channel 1030 is shown in FIG. 10 under a second shelf 104, but the slot or channel 1030 may be formed in or attached to a first shelf 102. The scissor-like arrangement of collapsible leg is another implementation of collapsible leg mechanism that may be used in the invention. While the scissor mechanism is shown with a front leg and a back leg forming a scissor-like arrangement, two front legs or two back legs may form the scissor-like arrangement.

Figure 11:
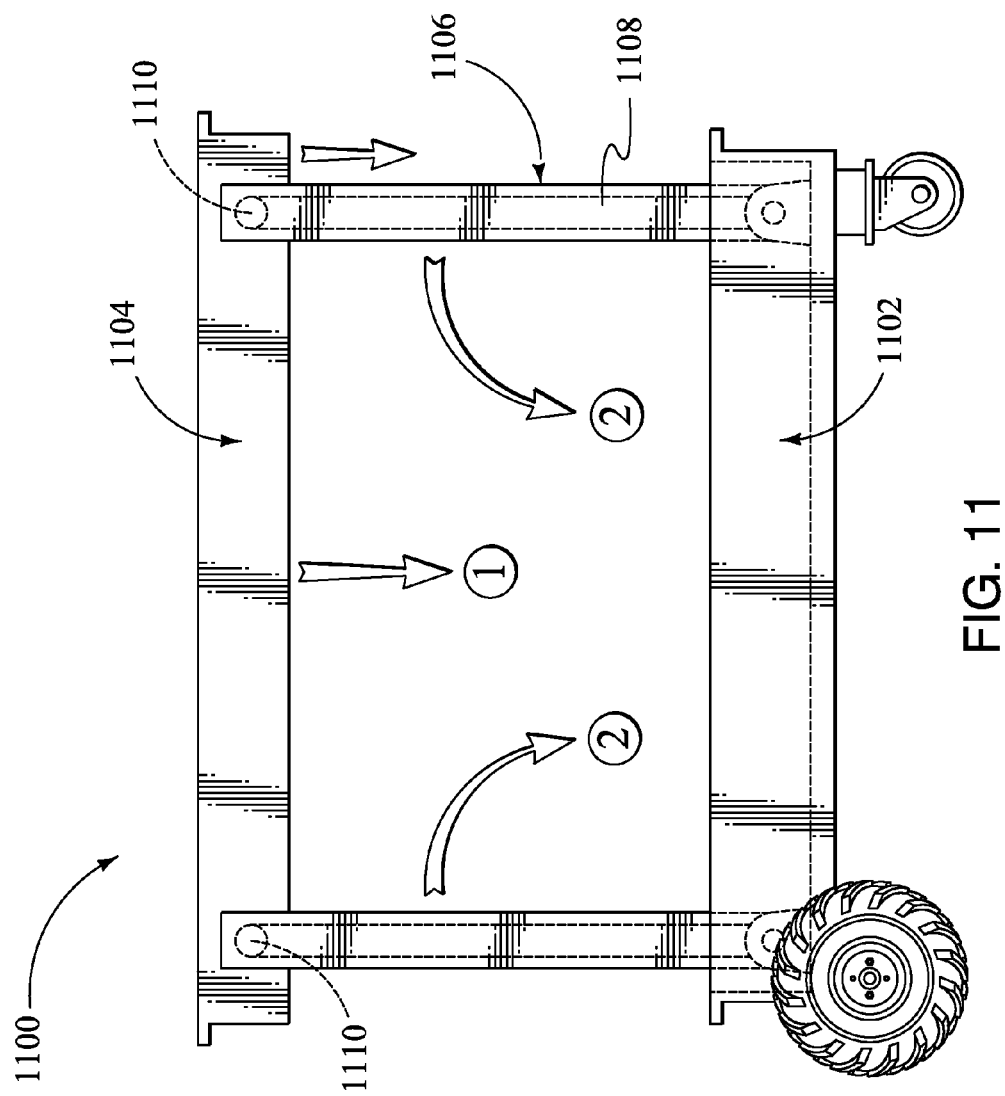
FIG. 11 is a perspective view of a collapsible cart according to a seventh exemplary implementation.

FIG. 11 is a perspective view of a collapsible cart according to a seventh exemplary implementation. With reference to FIG. 11, to collapse this implementation of a collapsible cart 1100, a series of steps is performed. First, an engagement mechanism (not shown) is released such that a second shelf 1104 is no longer locked or reversibly fixed to each of leg 1106. For example, an engagement mechanism comprises a spring-loaded bolt, one for each leg 1106. In such case, each spring-loaded bolt is disengaged, one from each corner of the second shelf 1104 corresponding to a respective leg 1106. Next, the second shelf 1104 is lowered and nested or rested against a first shelf 1102. In one implementation, a spring-loaded bolt 1110 slides in a groove 1108 inside a cart leg 1106. Other implementations are possible. In a preferred implementation, the cart legs 1106 are reversibly connected to a first shelf 1102 and a second shelf 1104 and are merely separate parts of an assembled cart. To complete the series of steps to collapse the cart 1100, each cart leg 1106 is rotated into or against the second shelf 1104. In an alternative implementation, each cart leg 1106 may be rotated 270 degrees and placed against, near or adjacent to the first shelf 1102. Once collapsed, the cart 1100 may be further moved, handled, manipulated or stored.

Figure 12:
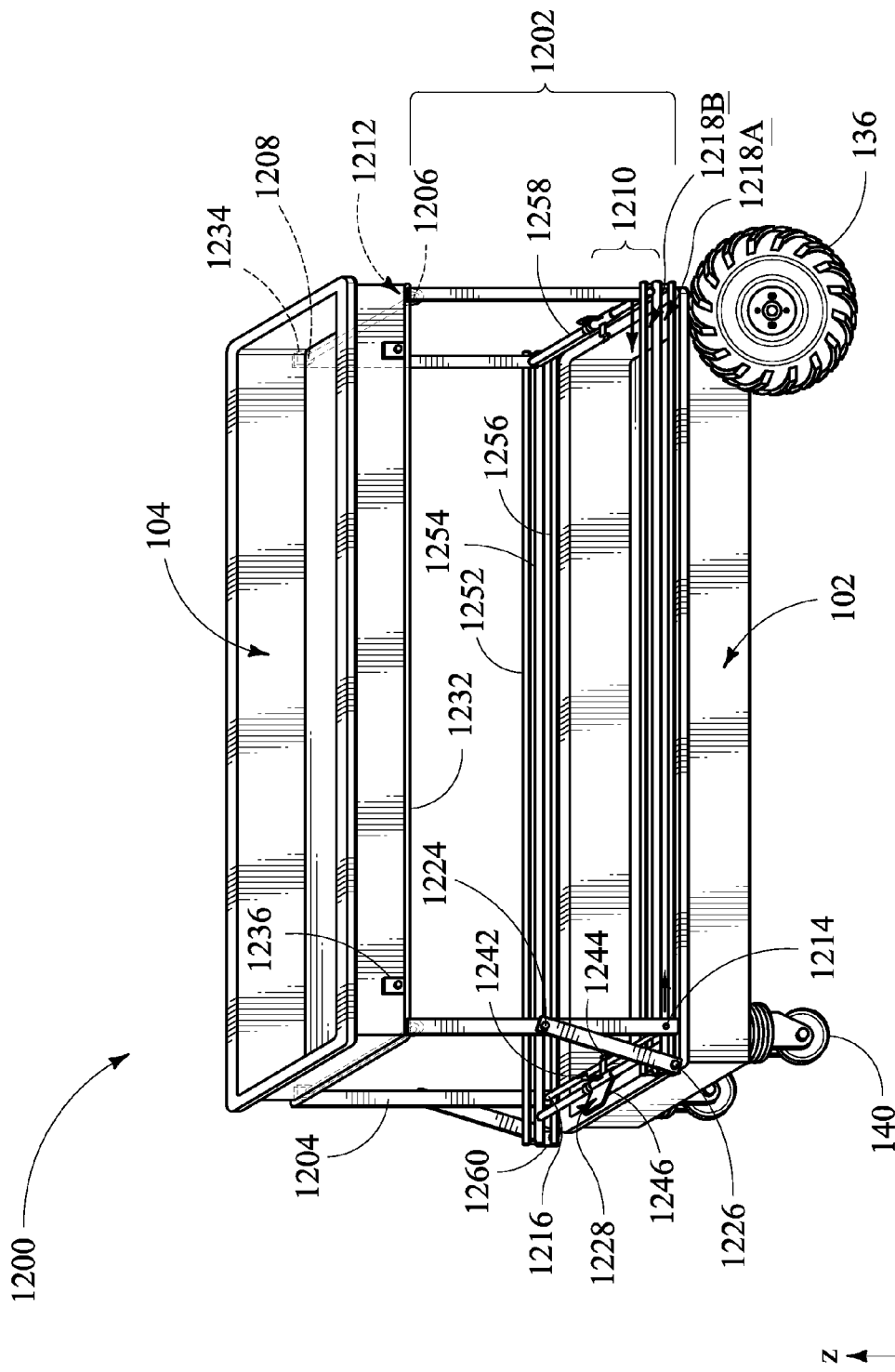
FIG. 12 is a perspective view of a collapsible cart in an extended state according to an eighth exemplary implementation.

FIG. 12 is a perspective view of a collapsible cart 1200 in an extended state according to an eighth exemplary implementation. With reference to FIG. 12, a collapsible cart 1200 comprises a support section 1202. A support section 1202 comprises one or more shelf support cross members 1208, a leg adjustment section 1210, one or more support members 1232, and one or more hinges or loops 1234. The shelf support members 1208 may be fastened or formed together and are fastened (either permanently, temporarily or removably) to one of the shelves or working surfaces. In FIG. 12, the top or second shelf or working surface 104 is shown attached to the shelf support members 1208 and the two (working surface and support members) are attached together by fasteners 1236.

A movable or collapsible cart leg 1204 at its proximal end 1212 is rotatably attached with a pin 1206 in a hinge or bracket 1234. A nut or other fastener may be used in conjunction with the pin 1206 and hinge or bracket 1234. At its distal end 1214, the movable cart leg 1204 is preferably not directly fixed to the support section 1202. The movable cart legs are each slidably engaged in the leg adjustment section 1210. In one implementation, the leg adjustment section 1210 comprises a first rail 1252, a second rail 1254, and a third rail 1256. The first rail 1252 and the second rail 1254 form a slot or track 1218B in which a distal end of each rear leg 1204 may slide when the collapsible cart 1200 is placed into a collapsed state. Similarly, the second rail 1254 and the third rail 1256 form a slot or track 1218A in which the distal end of each front leg 1204 may slide when the collapsible cart 1200 is placed into a collapsed state. A cross beam or rail 1258, preferably one on each end of the leg adjustment section 1210, provides stability and strength to the leg adjustment section 1210. Vertical support members 1260 may be used to brace the rails 1252, 1254 and 1256. Alternatively, instead of three rails, the side portions of the leg adjustment section 1210 may be formed from a solid block of metal and the leg adjustment section 1210 may not comprise vertical support members 1260.

A cross member 1216 connects distal ends 1214 of two movable cart legs 1204, one connecting the front pair of movable cart legs 1204 and one cross member 1216 connecting the rear pair of movable cart legs 1204. As the second shelf 104 is extended or raised relative to a first shelf 102, the cross member 1216 may contact, stick to or engage in ridges, grooves or depressions (not shown) in a corresponding slot, track or channel 1218A, 1218B. In this way, the cross member 1216 may take steps as the second shelf 104 is ratcheted or gradually raised or extended upward, or gradually lowered or compressed toward the first shelf 102 downward. A support arm provides additional support and stability to each movable cart leg 1204. A support arm is rotatably attached to a movable cart leg 1204 at a pivot point 1224 in a cart leg 1204. The other end 1226 of the support arm is rotatably attached to or near the leg adjustment section 1210.

The movable cart legs 1204 and second shelf 104 may be held in a collapsed state by a lock mechanism 1228. In one implementation, the lock mechanism 1228 comprises a shelf locking arm 1242, a leg locking arm 1244 and a lever 1246. A shelf locking arm 1242 reversibly engages, for example, a second shelf 104 when the collapsible cart 1200 is in a collapsed state. A leg locking arm 1244 holds or forces one or more cross members 1216 toward a maximally extended position such that the cart 1200 may be loaded without fear of the cart legs 1204 moving on their own. The lock mechanism may be spring loaded so as to facilitate removably engaging either a shelf, or a cross member 1216 or collapsible leg 1204 or other part comprising the support section 1202.

The support section 1202 may be fixedly or removably attached to one or both of the two shelves. In one implementation, the support section 1202 nests inside a first shelf 102 or inside a second shelf 104 when the collapsible cart 1200 is in a collapsed state. Alternatively, the support may reside between the two shelves 102, 104 such that the leg adjustment section 1210 rests on or near or in between one of the shelves 102, 104. Alternatively, the support section 1202, when the cart is collapsed, may be removed from the shelves 102, 104 and stored inside or to one or more of the shelves 102, 104 for convenience. Preferably, the support section collapses and takes up minimal vertical space when the collapsible cart 1200 is in a collapsed state.

FIG. 13 is a perspective close-up view of one implementation of a knee joint 1300 for an implementation of a collapsible leg for a collapsible cart, an alternative joint to the one shown in FIG. 1 and FIG. 2. The elements comprising FIG. 13 are not drawn to scale and are shown for purposes of illustration only. With reference to FIG. 13, a tang 1302 of an upper leg segment 1304 is reversibly inserted into a recess 1306 in a lower leg segment 1308. When the upper leg segment 1304 and the lower leg segment 1308 are properly aligned, a spring-loaded ball lock 1310 engages an opening or ball recess 1312 in the lower leg segment 1308. The upper leg segment 1306 and lower leg segment 1308 are each preferably of a rectangular or square cross-section. Such leg segments provide for strong lateral stability, yet can be relatively lightweight for use with a collapsible and useful cart. In one implementation, a knee joint 1300 is comprised of a hinge pin or hinge axis 1314 around which rotate hinge tabs 1316. One or more corresponding hinge tabs 1316 are affixed (by welding, glue or other means) to either an upper leg segment 1304 or a lower leg segment 1308.

The foregoing discussion has been presented for purposes of illustration and description. Various features from one implementation can be combined with other features from other implementations. The description is not intended to limit the invention to the form or forms disclosed herein. Consequently, variation and modification commensurate with the above teachings, within the skill and knowledge of the relevant art, are within the scope of the present invention. The implementations described herein and above are further intended to explain the best mode presently known of practicing the invention and to enable others skilled in the art to use the invention as such, or in other implementations, and with the various modifications required by their particular application or uses of the invention. It is intended that the appended claims be construed to include alternate implementations to the extent permitted.

We claim:

1. A collapsible cart comprising:
   a first pair of wheels;
   a second pair of wheels, wherein each of the first pair of wheels is larger in diameter than each of the second pair of wheels;
   a first working surface, wherein the first working surface comprises an outer profile, wherein each of the first pair of wheels is mounted outside the outer profile of the first working surface;
   at least one collapsible leg, wherein each collapsible leg is extendable to at least one extended position;
   a second working surface, wherein the second working surface comprises a slot running substantially parallel with either the first working surface or the second working surface, wherein the slot engages one end of the at least one collapsible leg.

2. The collapsible cart of claim 1 wherein a profile of each collapsible leg fits within the outer profile of the first working surface when the collapsible leg is in a collapsed state.

3. The collapsible cart of claim 1, wherein each collapsible leg includes a release mechanism, wherein when the release mechanism is engaged, the collapsible leg becomes placeable into a collapsed state.

4. The collapsible cart of claim 1, wherein the collapsible cart further comprises:
   a leg bracket for each collapsible leg, wherein another end of at least one of the said at least one collapsible leg is fixed in a respective leg bracket.

5. The collapsible cart of claim 1 wherein the collapsible cart further comprises:
   a telescoping handle.

6. The collapsible cart of claim 1 wherein the collapsible cart further comprises:
   a means for securing the first working surface near the second working surface when the collapsible cart is in a collapsed state.

7. The collapsible cart of claim 1, wherein each of the first pair of wheels is pliant, and wherein the first pair of wheels define a rear wheel axis.

8. The collapsible cart of claim 1, wherein the collapsible cart further comprises:
   a support arm for each respective collapsible leg.

9. The collapsible cart of claim 8, wherein each support arm is reversibly lockable in one of multiple positions.

10. The collapsible cart of claim 1 wherein a profile of at least one of the said at least one collapsible leg fits substantially outside an outer profile of the second working surface when the at least one collapsible leg is in a collapsed state.

11. The collapsible cart of claim 1 wherein a profile of at least one of the said at least one collapsible leg fits substantially inside an outer profile of the second working surface when the at least one collapsible leg is in a collapsed state.

12. The collapsible cart of claim 1, wherein the collapsible cart comprises four collapsible legs, wherein the first working surface comprises two slots, wherein the second working surface comprises two slots, and wherein two of the collapsible legs are engaged with a respective slot of the second working surface and the other two collapsible legs are engaged with a respective slot of the first working surface.

13. The collapsible cart of claim 1, wherein the collapsible cart comprises four collapsible legs, wherein the first working surface comprises two slots, and wherein two of the collapsible legs are engaged with a respective slot of the first working surface.

14. The collapsible cart of claim 1, wherein each of the second pair of wheels are extendable outside the outer profile of the first working surface.

15. A collapsible cart comprising:
    a first pair of wheels;
    a second pair of wheels, wherein each of the first pair of wheels is larger in diameter than each of the second pair of wheels;
    a first shelf, wherein the first shelf includes a profile, wherein each of the first pair of wheels is mounted outside the outer profile of the first shelf;
    collapsible legs, wherein each collapsible leg is extendable to at least one extended position;
    a second shelf, wherein the second shelf includes a profile, wherein either the first shelf or second shelf includes a slot running substantially parallel with either the first shelf or the second shelf, wherein the slot engages one end of at least one of the collapsible legs.

16. The collapsible cart of claim 15 wherein a profile of at least one of the said collapsible legs fits substantially inside the profile of the first working surface and inside the profile of the second working surface.

17. The collapsible cart of claim 15 wherein a profile of at least one of the said collapsible legs fits substantially inside the profile of the first working surface and outside the profile of the second working surface.

18. The collapsible cart of claim 15 wherein a profile of at least one of the said collapsible legs fits substantially outside the profile of the first working surface and inside the profile of the second working surface.

19. The collapsible cart of claim 15 wherein a profile of at least one of the said collapsible legs fits substantially outside the profile of the first working surface and outside the profile of the second working surface.

* * * * *